(12) United States Patent
Osterberg et al.

(10) Patent No.: US 8,581,456 B2
(45) Date of Patent: Nov. 12, 2013

(54) COOLING SYSTEM FOR AN ELECTRICAL MACHINE

(75) Inventors: Johan Osterberg, Vretstorp (SE); Stefan Palmgren, Vasteras (SE); Robert Larsson, Kilchberg (CH)

(73) Assignee: ABB AB (SE)

( * ) Notice: Subject to any disclaimer, the term of this patent is extended or adjusted under 35 U.S.C. 154(b) by 0 days.

(21) Appl. No.: 13/435,716

(22) Filed: Mar. 30, 2012

(65) Prior Publication Data

US 2012/0235522 A1 Sep. 20, 2012

Related U.S. Application Data

(63) Continuation of application No. PCT/EP2009/062725, filed on Oct. 1, 2009.

(51) Int. Cl.
H02K 9/08 (2006.01)
(52) U.S. Cl.
USPC .............................................. 310/57; 310/64
(58) Field of Classification Search
USPC ................................................ 310/52–59, 64
See application file for complete search history.

(56) References Cited

U.S. PATENT DOCUMENTS

| | | | | |
|---|---|---|---|---|
| 3,968,388 A * | 7/1976 | Lambrecht et al. | ............. | 310/53 |
| 4,669,279 A * | 6/1987 | Maeda et al. | .................... | 62/505 |
| 5,844,333 A | 12/1998 | Sheerin | | |
| 6,499,532 B1 | 12/2002 | Williams | | |
| 6,700,237 B1 | 3/2004 | Yang | | |
| 7,777,374 B2 * | 8/2010 | Ressel | .............................. | 310/59 |
| 8,148,858 B2 * | 4/2012 | Hassett et al. | ................... | 310/52 |
| 8,421,285 B2 * | 4/2013 | Kori et al. | ........................ | 310/61 |
| 2002/0149273 A1 | 10/2002 | Soitu et al. | | |
| 2004/0007011 A1 | 1/2004 | Tanaka | | |
| 2007/0163759 A1 | 7/2007 | Klein et al. | | |
| 2008/0024020 A1 | 1/2008 | Iund et al. | | |
| 2008/0238224 A1 * | 10/2008 | Ressel | ............................. | 310/64 |
| 2009/0315415 A1 * | 12/2009 | Elnar | ............................. | 310/54 |
| 2010/0033042 A1 * | 2/2010 | Hassett et al. | .................. | 310/64 |
| 2011/0181137 A1 * | 7/2011 | Kori et al. | ....................... | 310/59 |

FOREIGN PATENT DOCUMENTS

DE 3311086 A1 9/1984
DE 102004007484 A1 9/2005

OTHER PUBLICATIONS

International Search Report and Written Opinion of the International Searching Authority; Application No. PCT/EP2009/062725; Issued: Apr. 6, 2011; Mailing Date: Apr. 15, 2011; 10 pages.

* cited by examiner

Primary Examiner — Thanh Lam
(74) Attorney, Agent, or Firm — St. Onge Steward Johnston & Reens LLC

(57) ABSTRACT

A cooling system for an electrical machine includes a substantially closed housing, a first heat exchanger arranged inside of the housing, a second heat exchanger arranged outside of the housing, a conduit assembly for transferring a heat exchange medium in a closed circuit between the first and the second heat exchangers, a first air circulating means configured to circulate air inside of the housing over the first heat exchanger, and a second air circulating means configured to circulate air outside of the housing over the second heat exchanger, wherein the conduit assembly includes a pump for actively circulating the heat exchange medium between the first and the second heat exchangers.

12 Claims, 2 Drawing Sheets

COOLING SYSTEM FOR AN ELECTRICAL MACHINE

CROSS-REFERENCE TO RELATED APPLICATIONS

The present application is a continuation of pending International patent application PCT/EP2009/062725 filed on Oct. 1, 2009 which designates the United States and the content of which is incorporated herein by reference.

FIELD OF THE INVENTION

The present invention relates to cooling systems comprising heat exchangers. The invention relates especially to electrical machines where a complete cooling system is mounted directly on the electrical machine.

BACKGROUND OF THE INVENTION

During the operation of large electrical machines such as motors and generators a substantial amount of heat is generated in the active parts i.e. the stator and the rotor of the machines. The excess heat has to be transferred out of the machine in order to avoid malfunction because of overheating. Therefore, large electrical machines are provided with cooling systems that implement the heat transfer function.

Cooling systems may comprise a great variety of technical principles and practical solutions depending on the amount of heat, access to a cooling medium, requirements of the machine, etc. One typical machine requirement is that the interior of the machine housing should not be in direct contact with the ambient air. Some of the conventionally used cooling principles in the case of such closed housing are disclosed in the following patent publications.

U.S. Pat. No. 6,700,237 discloses in the embodiments of FIGS. 1 to 8 an electrical machine in which the machine housing is provided with cooling fins such that the housing itself functions as a heat exchanger to the ambient air. In further embodiments U.S. Pat. No. 6,700,237 discloses external heat exchangers where the air circulated through the interior of the machine is cooled.

U.S. 2002/0149273 discloses an electric motor comprising an internal cooling air circuit and an annular heat exchanger with ducts for a cooling liquid. U.S. 2002/0149273 does not thoroughly describe the cooling liquid circuit outside of the motor housing, but in a typical arrangement the ducts are connected to an external water pipe network.

U.S. Pat. No. 5,844,333 discloses an electric motor air cooler using an air-to-air heat exchanger. The air cooler comprises an ambient air fan for circulating ambient air over the heat exchanger, and an internal fan for circulating the air inside of the motor housing and over the heat exchanger.

U.S. Pat. No. 6,499,532 discloses an electric motor cooling system comprising a first blower for circulating the air inside a motor housing and over a first half of a heat pipe array, and a second blower for forcing the ambient air over a second half of the heat pipe array.

Some of the aforementioned cooling principles have the drawback that they assume the use of an external cooling medium such as water. While it often is burdensome to install the water piping to the machine, in some circumstances there is not even access to external water. The remaining conventional cooling principles have the drawback that the efficiency is poor and the dimensions of the resulting heat exchangers are huge compared to the machine dimensions.

SUMMARY OF THE INVENTION

One object of the invention is to provide a compact and efficient cooling system for an electrical machine, which cooling system is independent from external cooling media and can be assembled directly on the machine.

A further object of the invention is to provide an efficient method for cooling an electrical machine by using compact elements, which method is independent from external cooling media.

These objects are achieved by a cooling system for an electrical machine and a method for cooling an electrical machine.

According to a first aspect of the invention, there is provided a cooling system for an electrical machine. The cooling system comprises a substantially closed housing, a first heat exchanger arranged inside of the housing, a second heat exchanger arranged outside of the housing, a conduit assembly for transferring a heat exchange medium in a closed circuit between the first and the second heat exchangers, a first air circulating means configured to circulate air inside of the housing over the first heat exchanger, and a second air circulating means configured to circulate air outside of the housing over the second heat exchanger. The conduit assembly comprises a pump for actively circulating the heat exchange medium between the first and the second heat exchangers.

By providing the cooling system with a closed circuit between the heat exchangers, the system is independent from external conditions such as access to cooling water. By providing the conduit assembly with a pump, the heat transfer between the heat exchangers is rendered efficient and the overall efficiency of the cooling system is considerably improved.

According to one embodiment of the invention, the housing supports mechanically the second heat exchanger in relation to the ground. By arranging the housing and the second heat exchanger into one unit, the combination can be easily moved or transported without the need of installing any pipes or the like anew.

According to one embodiment of the invention, the second heat exchanger is mounted on top of the housing. By this measure, floor area is saved and the unit becomes easily manageable and compact.

According to one embodiment of the invention, at least one of the first and the second air circulating means comprises a fan. A fan is a simple and effective way of providing an air circulation over the heat exchangers.

According to one embodiment of the invention, the heat exchange medium remains in a liquid state during the operation. When solely liquid heat exchange medium is used, a simple and cheap liquid pump is enough for accomplishing the fluid circulation.

According to one embodiment of the invention, the cooling system is comprised in an electrical machine comprising a stator, a rotor and a shaft. The subject cooling system is particularly advantageous for the cooling of electrical machines which require an effective cooling system and which eventually need to be moved around.

According to one embodiment of the invention, the first air circulating means is configured to circulate air over the heat sources of the machine. By this measure, the air transfer is considerably improved.

According to one embodiment of the invention, the heat sources comprise the stator and the rotor. The stator and the rotor are the most essential heat sources and they therefore have the greatest effect to the overall heat transfer efficiency.

According to one embodiment of the invention, the first air circulating means comprises a fan fixedly assembled to the shaft. By assembling the fan to the machine shaft, a need for an additional fan motor is avoided.

According to one embodiment of the invention, the second air circulating means comprises a fan fixedly assembled to the shaft. By this measure, a need for a yet additional fan motor is avoided.

According to a second aspect of the invention, there is provided a method for cooling an electrical machine comprising a stator and a rotor. The method comprises the steps of: providing the electrical machine with a substantially closed housing; providing a first heat exchanger inside of the housing; providing a second heat exchanger outside of the housing; providing a conduit assembly for transferring a heat exchange medium in a closed circuit between the first and the second heat exchangers; circulating air inside of the housing over the first heat exchanger; circulating air outside of the housing over the second heat exchanger; and actively circulating the heat exchange medium between the first and the second heat exchangers.

By cooling an electrical machine with a cooling system comprising a closed circuit between heat exchangers, the cooling of the machine is independent from external conditions such as access to cooling water. By actively circulating a heat exchange medium between the heat exchangers the heat transfer is rendered efficient and the overall efficiency of the cooling system is considerably improved.

BRIEF DESCRIPTION OF THE DRAWINGS

The invention will be explained in greater detail with reference to the accompanying drawings, wherein.

DETAILED DESCRIPTION OF THE INVENTION

Figure 1:
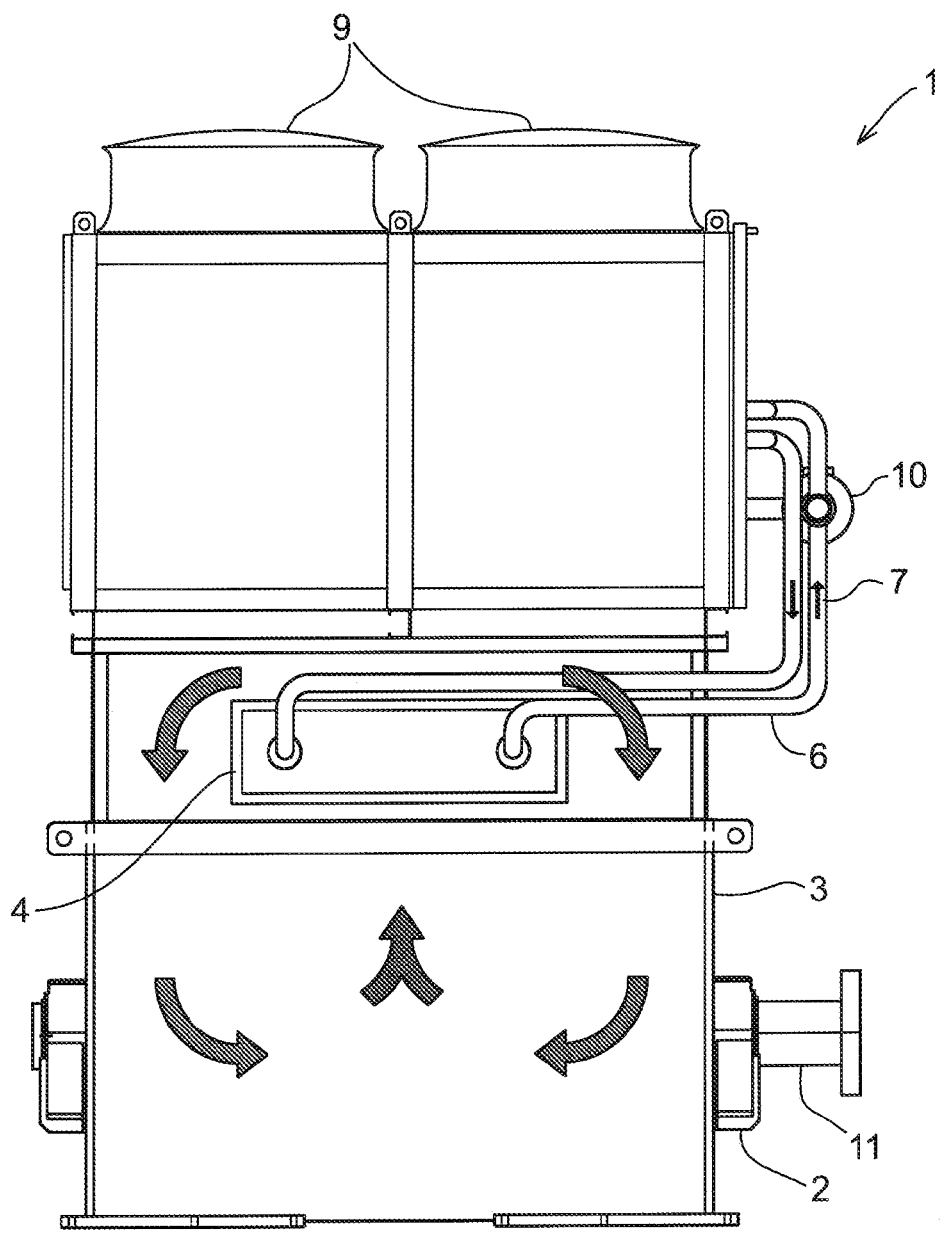
FIG. 1 shows a side view of a cooling system according to one embodiment of the invention.
Figure 2:
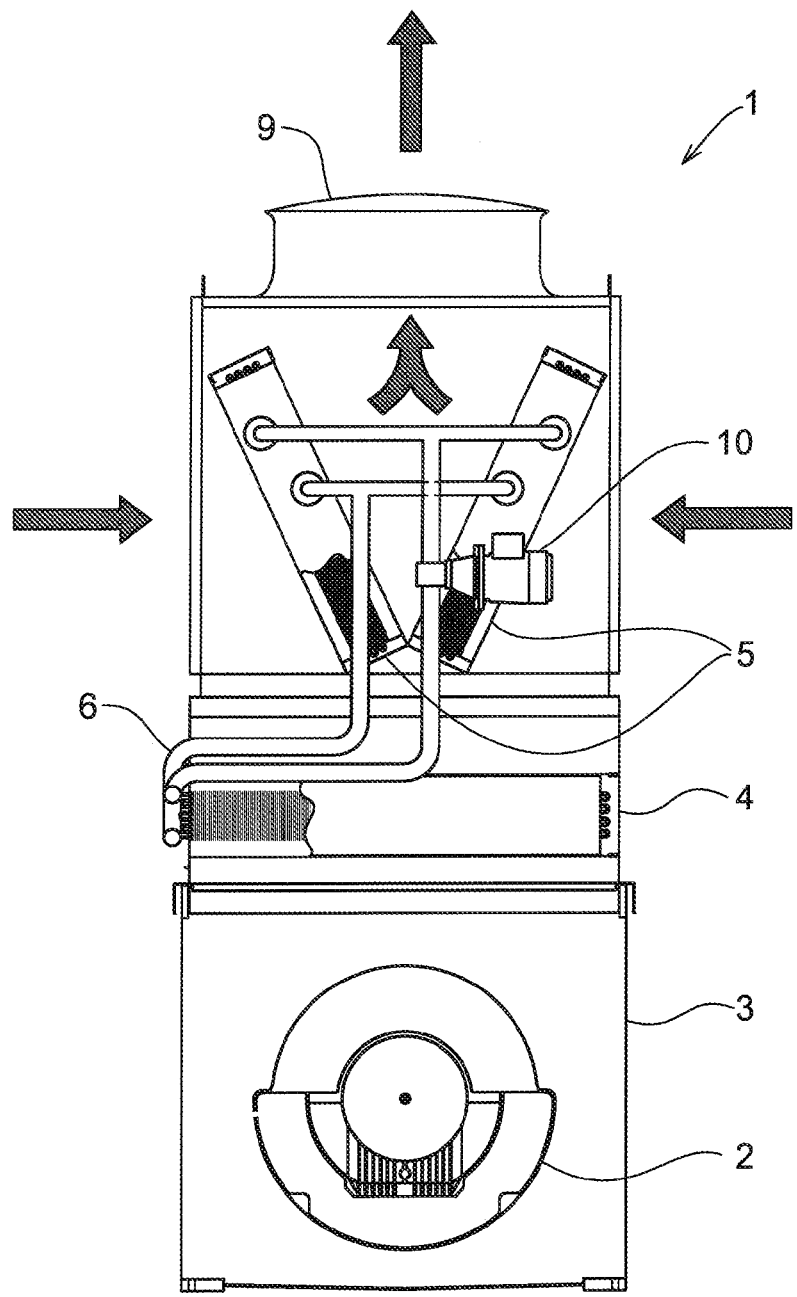
FIG. 2 shows an end view of the embodiment in FIG. 1.

Referring to FIGS. 1 and 2 a cooling system 1 mounted on an electrical machine 2 is shown. The cooling system 1 comprises a housing 3, a first heat exchanger 4, two second heat exchangers 5 and a conduit assembly 6 between the first and the second heat exchangers 4, 5. The heat exchangers 4, 5 and the conduit assembly 6 constitute a closed circuit inside of which a heat exchange medium 7 is constantly circulated with help of a pump 10. The conduit assembly 6 preferably consists of pipes but it can also comprise tubes or any other channels inside of which the heat exchange medium 7 can flow.

The heat exchange medium 7 may be any suitable cooling agent such as water, the cooling agent preferably being a liquid remaining in a liquid state during the operation. The heat exchange medium 7 is heated up in the first heat exchanger 4 and cooled down in the second heat exchangers 5 to thereby transfer heat out of the housing 3. It is obvious that the number of heat exchangers 4, 5 both inside and outside of the housing 3 may be varied according to the cooling requirements.

Further referring to FIGS. 1 and 2, the second heat exchangers 5 are mounted on top of the housing 3. The second heat exchangers 5 are provided with appropriate attachment means for rigidly mounting them to the housing 3. The housing 3 thereby mechanically supports the second heat exchangers 5 in relation to the ground, and the resulting cooling system 1 can be considered as a single rigid unit. An electrical machine 2 provided with such a cooling system 1 can easily be moved without the need of drawing any pipe installations at the site anew.

The heat is mostly generated in the active parts i.e. in the stator and the rotor of the machine 2. In order to efficiently transfer the heat from these heat sources to the first heat exchanger 4 the air inside of the housing 3 is circulated. A first air circulating means (not shown) is provided to circulate the air over the heat sources inside the machine 2 and further over the first heat exchanger 4. The first air circulating means may comprise a fan fixedly assembled to a shaft 11 of the machine 2.

In order to render the heat exchange in the second heat exchanger 5 more efficient, a second air circulating means 9 is provided to circulate or force the ambient air over the second heat exchanger 5. The second air circulating means 9 may comprise a fan assembled next to the second heat exchanger 5, but the fan may just as well be fixedly assembled to the shaft 11 so that no additional fan motor is needed. In case of the latter option either the second heat exchanger 5 is brought close to the shaft 11 or suitable conduits are provided for guiding the air from the fan to the second heat exchanger 5.

The invention is not limited to the embodiments shown above, but the person skilled in the art may, of course, modify them in a plurality of ways within the scope of the invention as defined by the claims.

What is claimed is:

1. A cooling system for an electrical machine, the cooling system comprising:
   a substantially closed housing,
   a first heat exchanger arranged inside of the housing,
   a second heat exchanger arranged outside of the housing,
   a conduit assembly for transferring a heat exchange medium in a closed circuit between the first and the second heat exchangers,
   a first air circulating means configured to circulate air inside of the housing over the first heat exchanger, and
   a second air circulating means configured to circulate air outside of the housing over the second heat exchanger,
   characterized in that the conduit assembly comprises a pump for actively circulating the heat exchange medium between the first and the second heat exchangers.

2. The cooling system according to claim 1, wherein the housing mechanically supports the second heat exchanger in relation to the ground.

3. The cooling system according to claim 2, wherein the second heat exchanger is mounted on top of the housing.

4. The cooling system according to claim 1, wherein at least one of the first and the second air circulating means comprises a fan.

5. The cooling system according to claim 1, wherein the heat exchange medium remains in a liquid state during the operation.

6. An electrical machine comprising a stator, a rotor, a shaft and a cooling system, the cooling system comprising:
   a substantially closed housing,
   a first heat exchanger arranged inside of the housing,
   a second heat exchanger arranged outside of the housing,
   a conduit assembly for transferring a heat exchange medium in a closed circuit between the first and the second heat exchangers,
   a first air circulating means configured to circulate air inside of the housing over the first heat exchanger, and
   a second air circulating means configured to circulate air outside of the housing over the second heat exchanger, characterized in that the conduit assembly comprises a pump for actively circulating the heat exchange medium between the first and the second heat exchangers.

7. The electrical machine according to claim 6, wherein the first air circulating means is configured to circulate air over the heat sources of the machine.

8. The electrical machine according to claim 7, wherein the heat sources comprise the stator and the rotor.

9. The electrical machine according to claim 6, wherein the first air circulating means comprises a fan fixedly assembled to the shaft.

10. The electrical machine according to claim 6, wherein the second air circulating means comprises a fan fixedly assembled to the shaft.

11. A method for cooling an electrical machine comprising a stator and a rotor, the method comprising the steps of:

providing the electrical machine with a substantially closed housing;

providing a first heat exchanger inside of the housing;

providing a second heat exchanger outside of the housing;

providing a conduit assembly for transferring a heat exchange medium in a closed circuit between the first and the second heat exchangers;

circulating air inside of the housing over the first heat exchanger; and circulating air outside of the housing over the second heat exchanger;

characterized by actively circulating the heat exchange medium between the first and the second heat exchangers.

12. The method according to claim 11, wherein the method comprises the step of circulating air over the stator and the rotor.

* * * * *